US012119530B2

(12) United States Patent
Hu (10) Patent No.: US 12,119,530 B2
(45) Date of Patent: Oct. 15, 2024

(54) COMBINER (71) Applicant: Huawei Technologies Co., Ltd., Shenzhen (CN)

(72) Inventor: Jian Hu, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 259 days.

(21) Appl. No.: 17/721,566

(22) Filed: Apr. 15, 2022

(65) Prior Publication Data
US 2022/0238976 A1 Jul. 28, 2022

Related U.S. Application Data (63) Continuation of application No. PCT/CN2019/111166, filed on Oct. 15, 2019.

(51) Int. Cl.
H01P 1/213 (2006.01)
H01P 5/12 (2006.01)
(Continued)

(52) U.S. Cl.
CPC ............... H01P 1/213 (2013.01); H01P 5/12 (2013.01); H01P 7/06 (2013.01); *H04B 1/30* (2013.01)

(58) Field of Classification Search
CPC ... H01P 1/213; H01P 5/12; H01P 7/06; H04B 1/30
See application file for complete search history.

(56) References Cited

U.S. PATENT DOCUMENTS

2003/0011444 A1 1/2003 Wang
2011/0317714 A1 12/2011 Arias et al.
(Continued)

FOREIGN PATENT DOCUMENTS

CN 101557025 A 10/2009
CN 201584478 U 9/2010
(Continued)

OTHER PUBLICATIONS

Pozar, "7.3 The Wilkinson Power Divider; Microwave Engineering," 4th Edition, John Wiley and Sons, XP055955429, pp. 328-333 (Jan. 1, 2012).
(Continued)

*Primary Examiner* — Andrea Lindgren Baltzell
*Assistant Examiner* — Kimberly E Glenn
(74) *Attorney, Agent, or Firm* — Leydig, Voit & Mayer, Ltd.

(57) ABSTRACT

This application provides a combiner, including: a plurality of radio frequency channels, where an $i^{th}$ radio frequency channel includes: an input port, configured to receive as input a first signal corresponding to the $i^{th}$ radio frequency channel, where frequencies of signals corresponding to any two radio frequency channels are different; an output port, configured to output the first signal from the $i^{th}$ radio frequency channel; a resonant cavity component configured between the input port and the output port, including a plurality of resonant cavities connected in series; and a matching resonator, connected to any resonant cavity in the resonant cavity component; and a combination port, connected to an output port of each radio frequency channel, where the $i^{th}$ radio frequency channel is any of the plurality of radio frequency channels, and a consumable device is disposed between matching resonators of any two neighboring radio frequency channels.

6 Claims, 5 Drawing Sheets (51) Int. Cl.
  *H01P 7/06* (2006.01)
  *H04B 1/30* (2006.01)

(56) References Cited

U.S. PATENT DOCUMENTS

| | | |
|---|---|---|
| 2012/0249263 A1 | 10/2012 | Zhang |
| 2012/0327921 A1 | 12/2012 | Schirrmacher et al. |

FOREIGN PATENT DOCUMENTS

| | | | |
|---|---|---|---|
| CN | 201868548 U | * 6/2011 | |
| CN | 103138034 A | 6/2013 | |
| CN | 105576331 A | 5/2016 | |
| CN | 106099285 A | 11/2016 | |
| CN | 206098650 U | 4/2017 | |
| CN | 208489338 U | 2/2019 | |
| EP | 154984 A | * 9/1985 | ............ H01P 1/2138 |
| EP | 978895 A2 | * 2/2000 | ............ H01P 1/2135 |
| EP | 1294043 A2 | * 3/2003 | ............ H01P 1/2138 |
| JP | H10270915 A | 10/1998 | |
| JP | 2007300172 A | 11/2007 | |
| WO | 2015077938 A1 | 6/2015 | |
| WO | 2018145163 A1 | 8/2018 | |

OTHER PUBLICATIONS

CHEN Qihao et al., "Design of a High Degree of Isolation Cavity Dual-Frequency Combiner," Chinese Journal of Electron Devices, vol. 39, No. 2, total 4 pages (Apr. 2016). With English abstract.

Quan Yibo, "Research on fusion and retrofit scheme of antenna-feed system of wireless base station," Wireless Internet Technology, No. 17, total 2 pages (Sep. 2019). With English abstract.

Shaoqun Luo et al., "The design of multi-frequency combiner based on common cavity," 2014 IEEE International Conference on Communiction Problem-solving, total 4 pages, Institute of Electrical and Electronics Engineers, New York, New York (Mar. 19, 2015).

* cited by examiner

// COMBINER

CROSS-REFERENCE TO RELATED APPLICATIONS

This application is a continuation of International Application No. PCT/CN2019/111166, filed on Oct. 15, 2019, which is hereby incorporated by reference in its entirety.

TECHNICAL FIELD

This application relates to the wireless communications field, and in particular, to a combiner.

BACKGROUND

With continuous development and progress of communications technologies, especially the arrival of 5G, spectrums are becoming increasingly more crowded. A spectrum is usually continuously allocated between operators (for example, an operator A has a spectrum ranging from 3400 MHz to 3500 MHz, and an operator B has a spectrum ranging from 3500 MHz to 3600 MHz). In another aspect, to reduce manufacturing costs of an antenna feeder or due to a direct limitation of an antenna area, a plurality of network devices need to share an antenna feeder. In this case, a combiner is used as an important radio frequency part for sharing an antenna feeder between different network devices. In a process of combination to a same antenna feeder, it is not only required to reduce a loss caused by combination of network devices, but also required to ensure that a spectrum loss is not caused after combination, that is, it is required to ensure 100% utilization of the spectrum of each operator during application of the combiner.

In a conventional combination solution, three solutions are usually used in combination of two or more consecutive spectrum systems, which are respectively a bridge, a power division combiner, or a resonant cavity combiner. For the resonant cavity combiner, a network device system has a relatively small power loss in combination. However, in a conventional resonant cavity combiner solution, a spectrum with a specific bandwidth needs to be reserved as a guard bandwidth between combiners, so that mutual isolation between ports meets a requirement of isolation between network device systems. In addition, a port of each network device system also needs to meet a requirement matching the port. As a result, the spectrum reserved during combination cannot be used any longer, and consequently, a specific spectrum is lost, spectrum utilization is reduced, and precious spectrum resources are wasted.

This disclosure provides a design solution of a new combiner, so that a loss of the resonant cavity combiner can be low, and a guard bandwidth does not need to be reserved to avoid a spectrum loss, so as to compensate for a disadvantage of a conventional combiner solution, thereby achieving an optimal combination effect.

SUMMARY

This disclosure provides a combiner, which improves spectrum utilization of the combiner in an entire working range by using an out-of-band suppression feature of a filter, and reduces a power loss in combination.

According to a first aspect, a combiner is provided, including: a plurality of radio frequency channels, where an $i^{th}$ radio frequency channel in the plurality of radio frequency channels includes: an input port, configured to input a first signal corresponding to the $i^{th}$ radio frequency channel, where frequencies of signals corresponding to any two radio frequency channels are different; an output port, configured to output the first signal from the $i^{th}$ radio frequency channel; a resonant cavity component configured between the input port and the output port, including a plurality of resonant cavities connected in series; and a matching resonator, connected to any resonant cavity in the resonant cavity component; and a combination port, connected to an output port of each radio frequency channel, where the $i^{th}$ radio frequency channel is any of the plurality of radio frequency channels, and a consumable device is disposed between matching resonators of any two neighboring radio frequency channels.

According to this embodiment of this disclosure, the combiner improves spectrum utilization of the combiner in an entire working range by using an out-of-band suppression feature of a filter, and reduces a power loss in combination. The combiner provided in this embodiment of this application has a simple structure, low costs, and a high-power capacity.

With reference to the first aspect, in some embodiments of the first aspect, the consumable device is a resistor or a consumable circuit.

According to this embodiment of this disclosure, matching resonators of two neighboring radio frequency channels in the combiner may be electrically connected by using the resistor or the consumable circuit.

With reference to the first aspect, in some embodiments of the first aspect, a coupling screw is disposed between the plurality of resonant cavities.

According to this embodiment of this disclosure, the coupling screw may be disposed between the plurality of resonant cavities, and a coupling amount may be adjusted by adjusting a depth of the coupling screw in the resonant cavity of the combiner.

With reference to the first aspect, in some embodiments of the first aspect, the plurality of resonant cavities each include a resonator.

According to this embodiment of this disclosure, the radio frequency channel may be equivalent to a band-pass filter including a plurality of resonators.

With reference to the first aspect, in some embodiments of the first aspect, the resonator is a coaxial resonator, a dielectric resonator, a waveguide resonator, or a microstrip resonator.

With reference to the first aspect, in some embodiments of the first aspect, the combiner includes two radio frequency channels.

DESCRIPTION OF EMBODIMENTS

The following describes technical solutions of this disclosure with reference to accompanying drawings.

In a conventional combiner solution, three solutions are usually used in combination of two or more consecutive spectrum systems, which are respectively a bridge, a power division combiner, or a resonant cavity combiner. A 3 dB bridge or a 3 dB coupling combiner is general technologies, which are used in many radio frequency combination scenarios, and can combine same spectrums or different spectrums between systems. However, during combination, power of a network device system is lost by half, that is, 3 dB. As a result, power consumption of the network device system and energy consumption of the network device system are greatly increased. Due to a reciprocal feature of the combiner, both an uplink loss and a downlink loss are 3 dB, and therefore downlink coverage and uplink receiving power of a base station system are also increased by 3 dB. In addition, when the power of the network device system is relatively high, a load end of the combiner needs to bear half of high-power absorption of the system, and a load with a fairly high power capacity is required. Moreover, heat converted by using the power load needs to be dissipated, and an additional heat dissipator is required to dissipate the heat, which increases a volume and a weight of the combiner. When the combiner has three ports and wiring or matching of an output port of the combiner is abnormal, isolation between two input ports deteriorates to as lowest as 6 dB. This isolation deterioration may cause mutual leakage of a signal between network device systems to a peer system in combination, which may damage an internal circuit or a device in the other system in combination, causing a failure of the network device system. However, the power division combiner is a general technology, which is used in many radio frequency combination scenarios, and can combine same spectrums or different spectrums in a system. During combination, power of a network device system is lost by half, that is, 3 dB. As a result, power consumption and energy consumption of the network device system are greatly increased. Because the power is lost by half, both downlink coverage and uplink receiving performance of the network device system are lost by half. When the power of the network device system is relatively large, a power resistor of the combiner needs to bear half of high-power absorption of the network device system, and a load with a fairly high power capacity is required. Moreover, heat converted by using the power resistor needs to be dissipated, and an additional heat dissipator is required to dissipate the heat, which increases a volume and a weight of the combiner. When the combiner has three ports and wiring or matching of output port of the combiner is abnormal, isolation between two input ports deteriorates to as lowest as 6 dB. This isolation deterioration may cause mutual leakage of a signal between network device systems to a peer network device system in combination, which may damage an internal circuit or a device in the other network device system in combination, causing a failure of the network device system. For the resonant cavity combiner, a network device system has a relatively small power loss in combination. However, in a conventional resonant cavity combiner solution, a specific spectrum needs to be reserved as a guard bandwidth between combiners, so that mutual isolation between ports meets a requirement of isolation between network device systems. In addition, a port of each network device system also needs to meet a requirement matching the port. As a result, the spectrum reserved during combination cannot be used any longer, and consequently, a specific spectrum is lost, spectrum utilization is reduced, and precious spectrum resources are wasted.

This disclosure provides a design solution of a new combiner, so that a loss of the resonant cavity combiner can be low, and a guard bandwidth does not need to be reserved to avoid a spectrum loss, so as to compensate for a disadvantage of a conventional combiner solution, thereby achieving an optimal combination effect.

Figure 1:
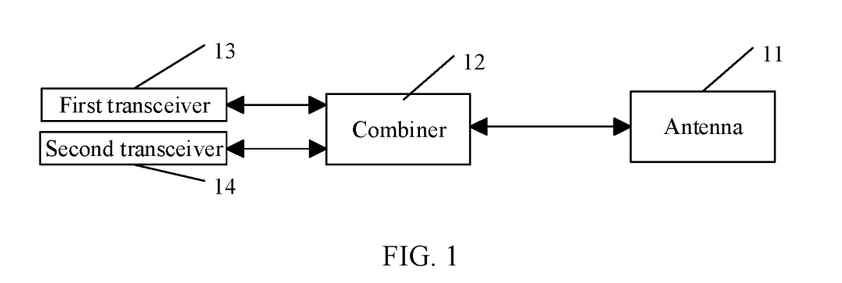
FIG. 1 is a schematic diagram of an architecture of a network device system applicable to an embodiment of this disclosure.

FIG. 1 is a schematic diagram of an architecture of a network device system applicable to an embodiment of this disclosure.

As shown in FIG. 1, the network device system may include an antenna 11, a combiner 12, a first transceiver 13, and a second transceiver 14. The first transceiver 13 may belong to a first network device, and the second transceiver 14 may belong to a second network device. To reduce manufacturing costs of an antenna feeder or due to a direct limitation of an antenna area, a plurality of network device systems need to share an antenna feeder. When the first transceiver 13 and the second transceiver 14 each send a signal to the outside, the signals may be combined by the combiner 12, and then the antenna 11 radiates a combined signal to the outside. When the first transceiver 13 and the second transceiver 14 each receive a signal, the antenna 11 receives the signal from the outside. Due to a reciprocal feature of the combiner, the combiner may be used as a splitter in this case, and the combiner 12 splits the signal received by the antenna 11 and then sends split signals to the first transceiver 13 and the second transceiver 14.

It should be understood that in this embodiment of this disclosure, a quantity of network devices in the network device system is merely an example, and may be changed based on an actual requirement and design. A quantity of network devices connected to the combiner is not limited in this embodiment of this disclosure.

With continuous development and progress of communications technologies, especially the arrival of 5G, spectrums become increasingly more crowded. A spectrum is usually continuously allocated between operators (for example, an operator A is 3400 MHz to 3500 MHz, and an operator B is 3500 MHz to 3600 MHz). In another aspect, to reduce manufacturing costs of an antenna feeder or due to a direct limitation of an antenna area, a plurality of network devices need to share an antenna feeder. In this case, a combiner is used as an important radio frequency part for sharing an antenna feeder between different network devices. In a process of combination to a same antenna feeder, it is not only required to reduce a loss caused by combination of network device systems, but also required to ensure that a spectrum loss is not caused after combination, that is, it is required to ensure 100% utilization of the spectrum of each operator during application of the combiner.

This disclosure provides a resonant cavity combiner, so that a loss of the resonant cavity combiner can be low, and a guard bandwidth does not need to be reserved to avoid a spectrum loss. In addition, due to a reciprocal feature of the combiner, the combiner may also be used as a splitter, so that a loss of the resonant cavity splitter can be low, and a guard bandwidth does not need to be reserved to avoid a spectrum loss.

Figure 2:
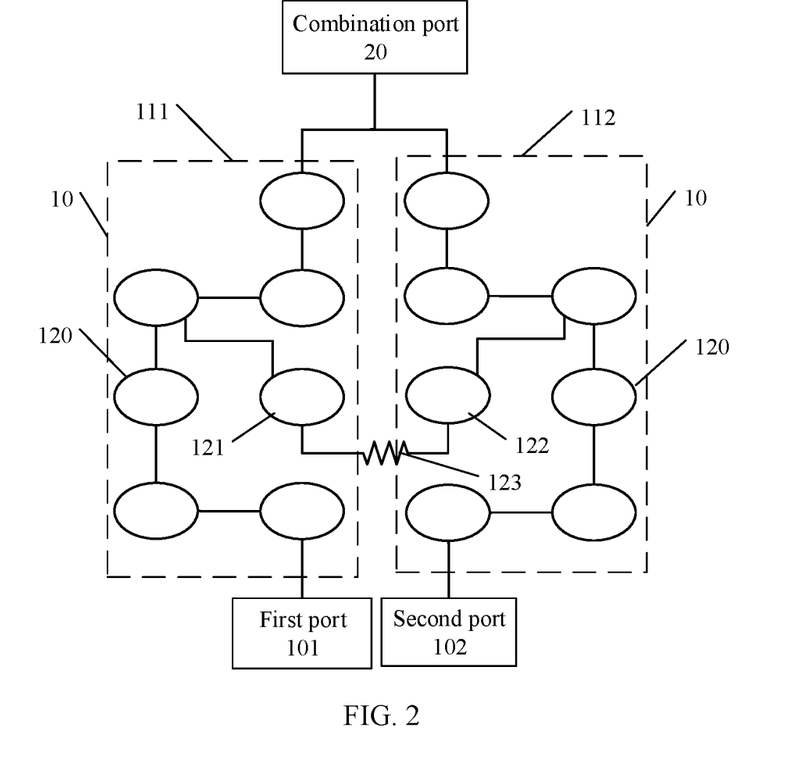
FIG. 2 is a schematic diagram of a structure of a combiner according to an embodiment of this disclosure.

FIG. 2 is a schematic diagram of a structure of a combiner according to an embodiment of this disclosure.

As shown in FIG. 2, the combiner may include a plurality of radio frequency channels 10 and a combination port 20. An $i^{th}$ radio frequency channel in the plurality of radio frequency channels 10 includes: an input port, configured to input a first signal corresponding to the $i^{th}$ radio frequency channel, where frequencies of signals corresponding to any two radio frequency channels are different; an output port, configured to output the first signal from the $i^{th}$ radio frequency channel; a resonant cavity component configured between the input port and the output port, including a plurality of resonant cavities connected in series; and a matching resonator, connected to any resonant cavity in the resonant cavity component, where i is a positive integer. The combination port is connected to an output port of each radio frequency channel, and the output port may be a last resonant cavity in a plurality of resonant cavities in each radio frequency channel. The $i^{th}$ radio frequency channel is any of the plurality of radio frequency channels, and a consumable device is disposed between matching resonators of any two neighboring radio frequency channels.

It should be understood that in this embodiment of this disclosure, two radio frequency channels are used as an example for description, but a quantity of radio frequency channels is not limited.

As shown in FIG. 2, the combiner may include a first radio frequency channel 111 and a second radio frequency channel 112. The first radio frequency channel 111 may include a first port 101, which serves as an input port of a signal. The second radio frequency channel 112 may include a second port 102, which serves as an input port of a signal. A plurality of resonant cavities 120 may be configured between the input port and an output port of the first radio frequency channel 111, and may be connected in series. A plurality of resonant cavities 120 may be configured between the input port and an output port of the second radio frequency channel 112, and may be connected in series.

The first radio frequency channel 111 may include a first matching resonator 121, which is connected to any resonant cavity 120 in a resonant cavity component. The second radio frequency channel 112 may include a second matching resonator 122, which is connected to any resonant cavity 120 in a resonant cavity component. A consumable device is disposed between matching resonators of any two neighboring radio frequency channels, and the matching resonators are electrically connected by using the consumable device. To be specific, the first matching resonator 121 of the first radio frequency channel 111 and the second matching resonator 122 of the second radio frequency channel are electrically connected by using a consumable device 123.

It should be understood that the first matching resonator 121, the second matching resonator 122, and the consumable device 123 serve as channels for communication between the first radio frequency channel 111 and the second radio frequency channel 112, to implement isolation between channels for combining two consecutive frequencies that are input, so that each port is completely matched in an entire combined frequency band.

Optionally, the first radio frequency channel 111 may be equivalent to a band-pass filter (which includes a plurality of resonators), and the first radio frequency channel 111 may be equivalent to a multi-order filter. The second radio frequency channel 112 between the second port 102 and the combination port 20 may be equivalent to a band-pass filter (which includes a plurality of resonators), and the second radio frequency channel 112 may be equivalent to a multi-order filter.

Optionally, the consumable device 123 may be a resistor or a consumable circuit, and may be correspondingly selected based on an actual requirement and design.

It should be understood that due to a reciprocal feature of the combiner, the combiner in the technical solution in this embodiment of this disclosure may also be used as a splitter. In this case, the combination port of the combiner is used as an input port of the splitter, and the input port of the combiner is used as an output port of the splitter.

The combiner provided in this embodiment of this disclosure improves spectrum utilization of the combiner in an entire working range by using an out-of-band suppression feature of a filter, and reduces a power loss in combination. The combiner provided in this embodiment of this disclosure has a simple structure, low costs, and a high-power capacity.

Figure 3:
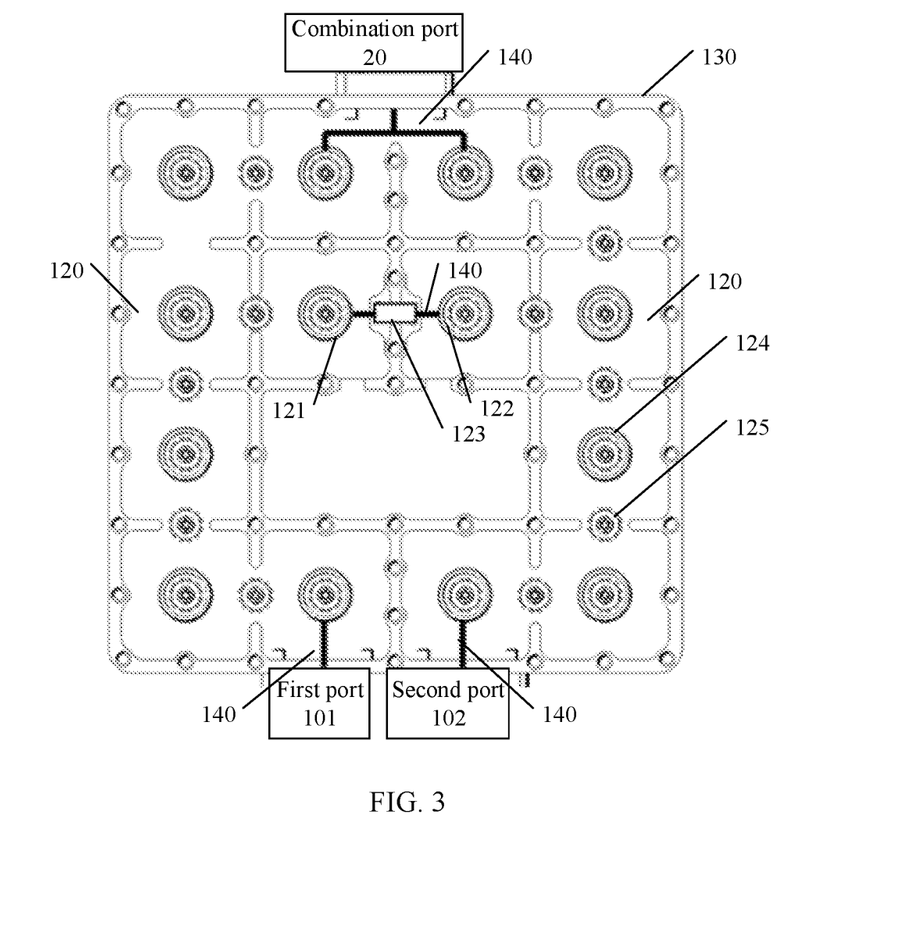
FIG. 3 is a schematic diagram of a structure of a combiner according to an embodiment of this disclosure.

FIG. 3 is a schematic diagram of a structure of a combiner according to an embodiment of this disclosure.

As shown in FIG. 3, the combiner includes a plurality of radio frequency channels and a combination port 20. An $i^{th}$ radio frequency channel in the plurality of radio frequency channels includes: an input port, configured to input a first signal corresponding to the $i^{th}$ radio frequency channel, where frequencies of signals corresponding to any two radio frequency channels are different; an output port, configured to output the first signal from the $i^{th}$ radio frequency channel; a resonant cavity component configured between the input port and the output port, including a plurality of resonant cavities connected in series; and a matching resonator, connected to any resonant cavity in the resonant cavity component, where i is a positive integer. The combination port is connected to an output port of each radio frequency channel, and the output port may be a last resonant cavity in a plurality of resonant cavities in each radio frequency channel. The $i^{th}$ radio frequency channel is any of the plurality of radio frequency channels, and a consumable device is disposed between matching resonators of any two neighboring radio frequency channels.

It should be understood that in this embodiment of this disclosure, two radio frequency channels are used as an example for description, but a quantity of radio frequency channels is not limited.

As shown in FIG. 3, the combiner may include a first radio frequency channel 111 and a second radio frequency channel 112. The first radio frequency channel 111 may include a first port 101, which serves as an input port of a signal. The second radio frequency channel 112 may include a second port 102, which serves as an input port of a signal. A plurality of resonant cavities 120 may be configured between the input port and an output port of the first radio frequency channel 111, and may be connected in series. A plurality of resonant cavities 120 may be configured between the input port and an output port of the second radio frequency channel 112, and may be connected in series.

The first radio frequency channel 111 may include a first matching resonator 121, which is connected to any resonant cavity 120 in a resonant cavity component. The second radio frequency channel 112 may include a second matching resonator 122, which is connected to any resonant cavity 120 in a resonant cavity component. A consumable device is disposed between matching resonators of any two neighboring radio frequency channels, and the matching resonators are electrically connected by using the consumable device. To be specific, the first matching resonator 121 of the first radio frequency channel 111 and the second matching resonator 122 of the second radio frequency channel are electrically connected by using a consumable device 123.

The combiner provided in this embodiment of this disclosure has a simple structure, low costs, and a high-power capacity.

It should be understood that the first matching resonator 121, the second matching resonator 122, and the consumable device 123 serve as channels for communication between the first radio frequency channel and the second radio frequency channel, to implement isolation between channels for combining two consecutive frequencies that are input, so that each port is completely matched in an entire combined frequency band.

Optionally, the consumable device 123 may be a resistor or a consumable circuit, and may be correspondingly selected based on an actual requirement and design.

Optionally, each of the plurality of resonant cavities 120 may include a resonator 124. The resonator 124 may be a coaxial resonator, a dielectric resonator, a waveguide resonator, or a microstrip resonator.

Optionally, a coupling screw 125 may be disposed between the plurality of resonant cavities 120, and a coupling amount may be adjusted by adjusting a depth of the coupling screw 125 in the resonant cavity of the combiner.

Optionally, the first radio frequency channel and the second radio frequency channel each may further include a transmission line 140. The transmission line 140 may be configured to electrically connect the resonant cavity 120 to the first port 101 and the second port 102. The transmission line 140 may be further configured to electrically connect the output ports the first radio frequency channel and the second radio frequency channel to the combination port 20. The output ports of the first radio frequency channel and the second radio frequency channel each may be a last resonant cavity in the plurality of resonant cavities. The transmission line 140 may provide signal transmission for each port.

Optionally, the consumable device 123 may be electrically connected to the first matching resonator 121 and the second matching resonator 122 by using the transmission line 140.

Optionally, the combiner may further include a housing 130, and the housing 130 may be of a metal material, such as steel, copper, and aluminum, to shield an external signal, thereby reducing interference to an internal signal.

Figure 4:
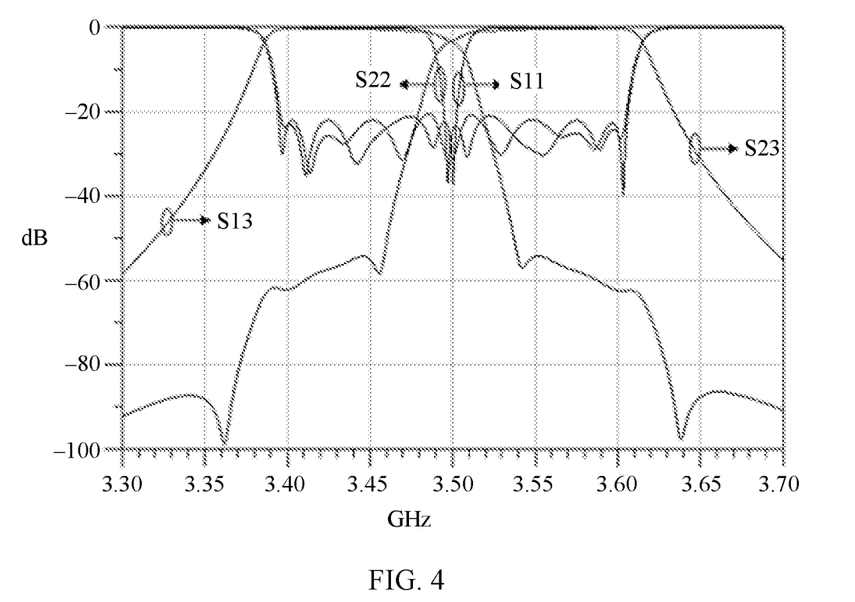
FIG. 4 is a schematic diagram of an S parameter according to an embodiment of this disclosure.

FIG. 4 is a schematic diagram of an S parameter according to an embodiment of this disclosure.

Optionally, a frequency range of a signal that is input from a first port may be 3.4 GHz to 3.5 GHz, and a frequency range of a signal that is input from a second port may be 3.5 GHz to 3.6 GHz.

As shown in FIG. 4, a central frequency of a combiner is 3.5 GHz, and a bandwidth of the combiner is about ±100 MHz. It should be understood that in the technical solution provided in the embodiments of this disclosure, the central frequency and the bandwidth of the combiner may be changed based on an actual requirement.

In the technical solutions provided in this disclosure, the first radio frequency channel and the second radio frequency channel are equivalent to two band-pass filters with consecutive passbands, and isolation between non-neighboring frequency bands between the first radio frequency channel and the second radio frequency channel is ensured by using an out-of-band suppression feature of the filter. In addition, the consumable device between the first radio frequency channel and the second radio frequency channel is used to match each port. In the combiner design solution provided in this disclosure, attenuation occurs only at a point at which passbands of the first radio frequency channel and the second radio frequency channel continue, and power attenuation of the combiner is ensured to be less than 3 dB in all remaining working frequency bands. Due to an out-of-band suppression feature of a filter, a guard frequency band is not required, and consecutive spectrums can be combined, so that spectrum utilization is not reduced.

It should be understood that in the combiner design solution provided in this disclosure, a power loss in combination is reduced, and energy consumption of a network device at an input end can be reduced. When losses of a combiner and a splitter in an antenna feeder are relatively small, because power reaching an antenna increases and a loss of power reaching a transceiver after receiving of the antenna becomes smaller, uplink coverage and downlink coverage of a network device system may increase. In addition, the combiner uses the out-of-band suppression feature of the filter. Therefore, combined with system software configuration and an algorithm, an ultra-wideband can be implemented by using an antenna feeder solution to expand a bandwidth of the network device system, and the following problem can be resolved: Combination port matching is poor after systems are combined by using a conventional bridge, and consequently isolation between combination ports become poorer. As a result, a system circuit or device loss is caused due to mutual leakage of a signal between the systems, resulting in a system failure.

Figure 5:
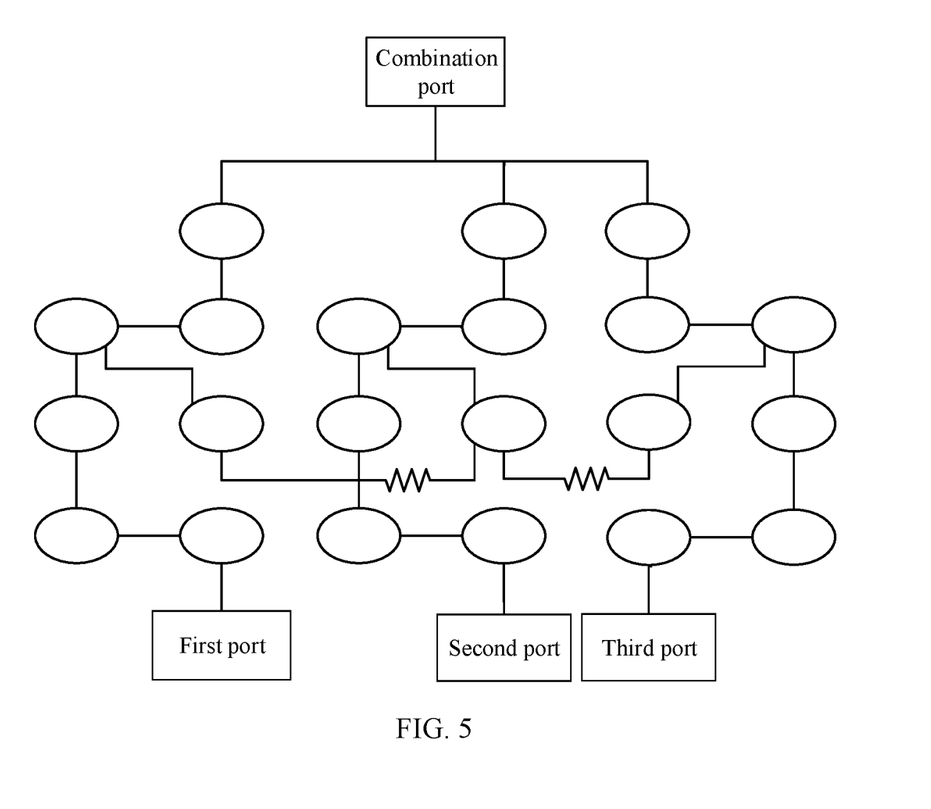
FIG. 5 is a schematic diagram of another combiner according to an embodiment of this disclosure.
Figure 6:
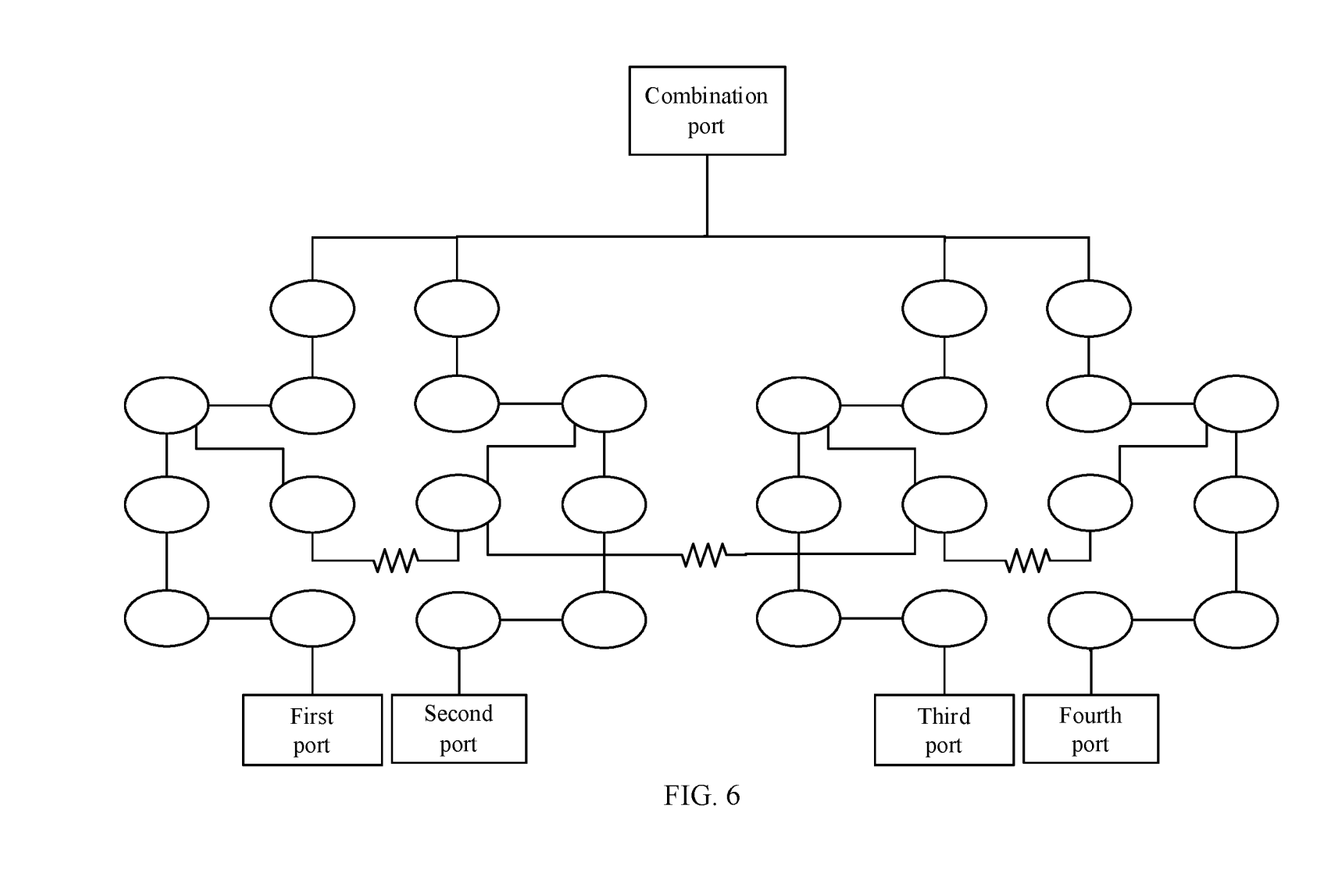
FIG. 6 is a schematic diagram of still another combiner according to an embodiment of this disclosure.

FIG. 5 and FIG. 6 are schematic diagrams of another combiner according to an embodiment of this disclosure.

It should be understood that the combiner may include a plurality of radio frequency channels based on a design and an actual requirement.

As shown in FIG. 5, the combiner may include a first radio frequency channel, a second radio frequency channel, and a third radio frequency channel, and input ports corresponding to the first radio frequency channel, the second radio frequency channel, and the third radio frequency channel may be a first port, a second port, and a third port. As shown in FIG. 6, the combiner may include a first radio frequency channel, a second radio frequency channel, a third radio frequency channel, and a fourth radio frequency channel, and input ports corresponding to the first radio frequency channel, the second radio frequency channel, the third radio frequency channel, and the fourth radio frequency channel may be a first port, a second port, a third port, and a fourth port. A quantity of input ports is not limited in this embodiment of this disclosure.

As shown in FIG. 5, serving as the input ports, the first port, the second port, and the third port may be respectively connected to corresponding output ports by using a resonant cavity component, and the resonant cavity component may include a plurality of resonant cavities connected in series. Each radio frequency channel includes a matching resonator, and the matching resonator is connected to any resonant cavity 120 in the resonant cavity components. A consumable device is disposed between matching resonators of any two neighboring radio frequency channels, and the matching resonators are electrically connected by using the consumable device.

As shown in FIG. 6, serving as the input ports, the first port, the second port, the third port, and the fourth port may be respectively connected to corresponding output ports by using a resonant cavity component, and the resonant cavity component may include a plurality of resonant cavities connected in series. Each radio frequency channel includes a matching resonator, and the matching resonator is connected to any resonant cavity 120 in the resonant cavity components. A consumable device is disposed between matching resonators of any two neighboring radio frequency channels, and the matching resonators are electrically connected by using the consumable device.

Optionally, the consumable device may be a resistor or a consumable circuit, and may be correspondingly selected based on an actual requirement and design.

Optionally, each of the plurality of resonant cavities may include a resonator. The resonator may be a coaxial resonator, a dielectric resonator, a waveguide resonator, or a microstrip resonator.

Optionally, a coupling screw may be disposed between the plurality of resonant cavities, and a coupling amount may be adjusted by adjusting a depth of the coupling screw in the resonant cavity of the combiner.

The units described as separate parts may or may not be physically separate. Parts displayed as units may or may not be physical units, to be specific, may be located in one position, or may be distributed on a plurality of network units. Some or all of the units may be selected based on actual requirements to achieve the objectives of the solutions in embodiments.

In addition, functional units in embodiments of this disclosure may be integrated into one processing unit, or each of the units may exist alone physically, or two or more units may be integrated into one unit.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A combiner, comprising:
a plurality of radio frequency channels, wherein an $i^{th}$ radio frequency channel in the plurality of radio frequency channels comprises:
an input port configured to receive as input a first signal corresponding to the $i^{th}$ radio frequency channel, wherein frequencies of signals corresponding to any two radio frequency channels in the plurality of radio frequency channels are different;
an output port configured to output the first signal from the $i^{th}$ radio frequency channel;
a resonant cavity component configured between the input port and the output port, comprising a plurality of resonant cavities connected in series; and
a matching resonator connected to any one of the plurality of resonant cavities in the resonant cavity component, wherein the matching resonator is used to match each port in an entire combined frequency band; and
a combination port connected to an output port of each radio frequency channel, wherein
the $i^{th}$ radio frequency channel is any one of the plurality of radio frequency channels; and
a consumable device is disposed between matching resonators of any two neighboring radio frequency channels in the plurality of radio frequency channels.

2. The combiner according to claim 1, wherein the consumable device is a resistor or a consumable circuit.

3. The combiner according to claim 1, wherein a coupling screw is disposed between the plurality of resonant cavities.

4. The combiner according to claim 1, wherein the plurality of resonant cavities each comprise a resonator.

5. The combiner according to claim 4, wherein the resonator is a coaxial resonator, a dielectric resonator, a waveguide resonator, or a microstrip resonator.

6. The combiner according to claim 1, wherein the combiner comprises two radio frequency channels in the plurality of radio frequency channels.

* * * * *